United States Patent
Al-Kahlan

(10) Patent No.: US 10,096,267 B1
(45) Date of Patent: Oct. 9, 2018

(54) DENTAL EDUCATION MODEL

(71) Applicant: KING SAUD UNIVERSITY, Riyadh (SA)

(72) Inventor: Lama Ahmed Al-Kahlan, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 15/864,744

(22) Filed: Jan. 8, 2018

(51) Int. Cl.
*G09B 23/28* (2006.01)
*G09B 23/34* (2006.01)

(52) U.S. Cl.
CPC ........... *G09B 23/283* (2013.01); *G09B 23/34* (2013.01)

(58) Field of Classification Search
USPC ................. 434/262, 263, 267, 33, 213, 214
See application file for complete search history.

(56) References Cited

U.S. PATENT DOCUMENTS

| | | | |
|---|---|---|---|
| 4,209,905 A | 7/1980 | Gillings | |
| 4,242,089 A | 12/1980 | Sasaki | |
| 4,508,507 A | 4/1985 | Jackson | |
| 4,902,232 A * | 2/1990 | Neustadter | G09B 23/283 434/263 |
| 4,997,372 A | 3/1991 | Shiner et al. | |
| 5,030,102 A * | 7/1991 | Lang | G09B 23/283 433/193 |
| 5,120,229 A * | 6/1992 | Moore | G09B 23/283 434/263 |
| 5,232,370 A * | 8/1993 | Hoye | G09B 23/283 434/263 |
| 6,257,895 B1 * | 7/2001 | Oestreich | G09B 23/283 434/263 |
| 6,524,105 B2 * | 2/2003 | Raffeiner | G09B 23/283 433/213 |
| 7,713,063 B2 * | 5/2010 | Lee | G09B 23/283 434/263 |
| 8,257,081 B2 | 9/2012 | Honkura et al. | |
| 8,465,291 B2 * | 6/2013 | Bell | G09B 23/283 434/262 |
| 8,696,361 B2 * | 4/2014 | Woidschutzke | G09B 23/283 434/262 |
| 8,801,437 B2 * | 8/2014 | Mousques | G09B 23/30 434/263 |
| 9,812,036 B2 * | 11/2017 | Lee | G09B 23/32 |
| 2009/0123898 A1 | 5/2009 | Lee et al. | |

(Continued)

*Primary Examiner* — Kurt Fernstrom
(74) *Attorney, Agent, or Firm* — Richard C. Litman

(57) ABSTRACT

The dental education model is a realistic model of a human jaw with removable teeth, including a base plate and a substantially U-shaped member simulating a human gingiva. The substantially U-shaped member has upper and lower surfaces, the lower surface being mounted on the base plate. The upper surface has a plurality of recesses defined therein. A plurality of first magnetic connectors are embedded in the substantially U-shaped member adjacent to closed ends of the plurality of recesses. A plurality of simulated teeth have coronal and root portions. The root portions of the plurality of teeth are removably received within the plurality of recesses formed in the substantially U-shaped member. A plurality of second magnetic connectors are embedded in the root portions of the plurality of the teeth, such that the first and second magnetic connectors are releasably magnetically attachable to one another.

7 Claims, 4 Drawing Sheets

(56) References Cited

U.S. PATENT DOCUMENTS

| | | |
|---|---|---|
| 2012/0129140 A1 | 5/2012 | Wren et al. |
| 2014/0024003 A1* | 1/2014 | Iwaki .................. G09B 23/283 434/263 |
| 2014/0045160 A1* | 2/2014 | Higashimura ....... G09B 23/283 434/263 |

* cited by examiner

DENTAL EDUCATION MODEL

BACKGROUND

1. Field

The disclosure of the present patent application relates to educational models, and particularly to a dental education model that realistically simulates the human jaw and has removable teeth.

2. Description of the Related Art

Dental models are widely used for teaching purposes and patient education. For example, dental models are often used to demonstrate various dental conditions to a patient and can be used to educate the patient about proper dental morphology and care. Further, for orthodontic evaluations in adults and children, dental models can be used to demonstrate alignment and occlusion. Dental models are also commonly used for visualizing dental alignment and occlusion for education and training of dentists and dental students.

Although a wide variety of dental models are in use, existing models suffer from numerous drawbacks. For example, conventional dental models often only represent an external aspect of tooth position and bite. Further, with regard to dental models having separable teeth, the teeth are often difficult to remove and insert in their corresponding positions in the model jaw. Additionally, such models often lack realism, particularly in the representing human gums. Thus, a dental education model solving the aforementioned problems is desired.

SUMMARY

The dental education model is a realistic model of a human jaw with removable teeth. The dental education model includes a base plate formed from a rigid material, such as plastic, and a substantially U-shaped member that simulates human gingiva (i.e., human gums). The substantially U-shaped member has opposed upper and lower surfaces, the lower surface being mounted on the base plate. The upper surface has a plurality of recesses formed therein, each recess being defined by opposed open and closed ends. Preferably, the substantially U-shaped member is formed from a rigid inner core, made of plastic or the like, which is covered by a layer of elastomeric material, such as silicone. The outer layer of elastomeric material is preferably textured, colored and made with an appropriate softness and resilience to realistically simulate human gingiva. A plurality of first magnetic connectors are embedded in the substantially U-shaped member adjacent to the closed ends of the plurality of recesses.

A plurality of simulated teeth each have opposed coronal and root portions. The root portions of the plurality of teeth are removably received within the plurality of recesses formed in the substantially U-shaped member. The coronal portions of the plurality of teeth simulate the crowns of human teeth. A plurality of second magnetic connectors are embedded in the root portions of the plurality of teeth, such that the first and second magnetic connectors are magnetically attracted to one another to releasably and removably hold the teeth within the recesses.

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
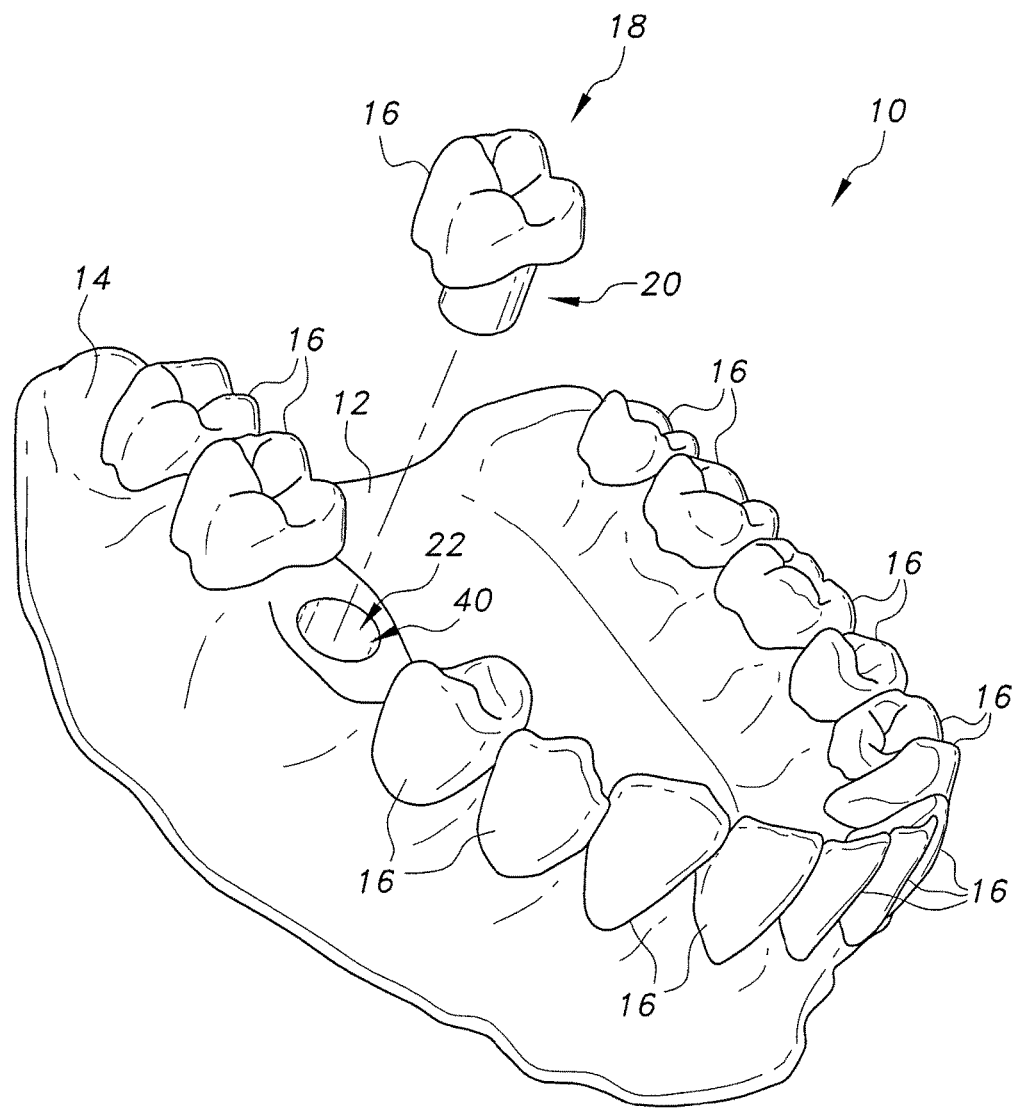
FIG. 1 is a perspective view of an exemplary dental education model.
Figure 2:
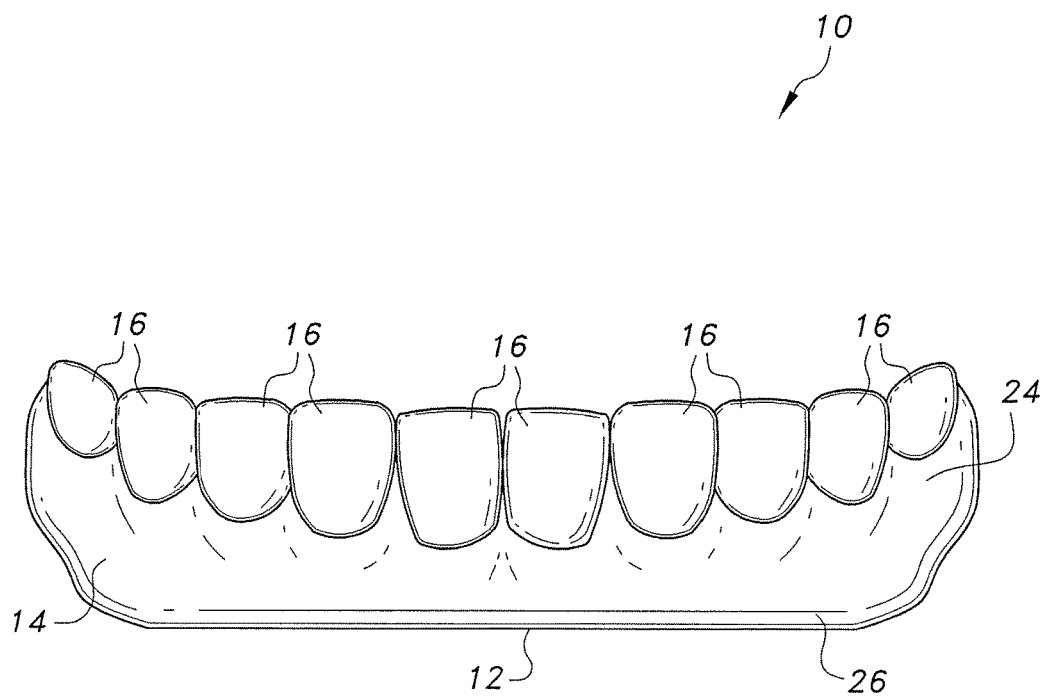
FIG. 2 is a front view of the dental education model of FIG. 1.
Figure 3:
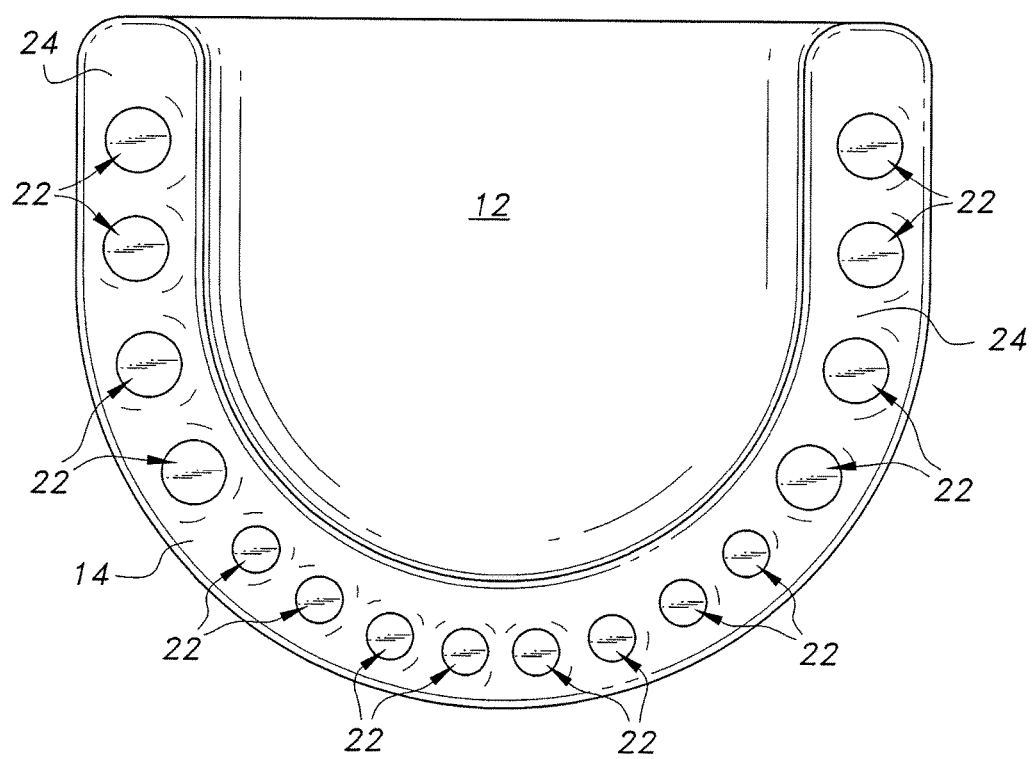
FIG. 3 is a top view of the dental education model of FIG. 1, shown with the teeth removed.

Referring to FIGS. 1-4, the dental education model 10 is a realistic model of a human jaw with removable teeth. The dental education model 10 includes a base plate 12 formed from a rigid material, such as plastic, and a substantially U-shaped member 14 which is simulative of a human gingiva (i.e., human gums). The substantially U-shaped member 14 has opposed upper and lower surfaces 24, 26, respectively, the lower surface 26 being mounted on the base plate 12. The upper surface 24 has a plurality of sockets or recesses 22 formed therein, each recess 22 being defined by opposed closed and open ends 38, 40, respectively. As will be described in greater detail below, the recesses 22 removably receive simulated teeth 16. Thus, there are preferably sixteen recesses 22 defined in the upper surface 24 of the substantially U-shaped member 14, realistically representative of the sixteen teeth found in a healthy human upper or lower jaw.

Figure 4:
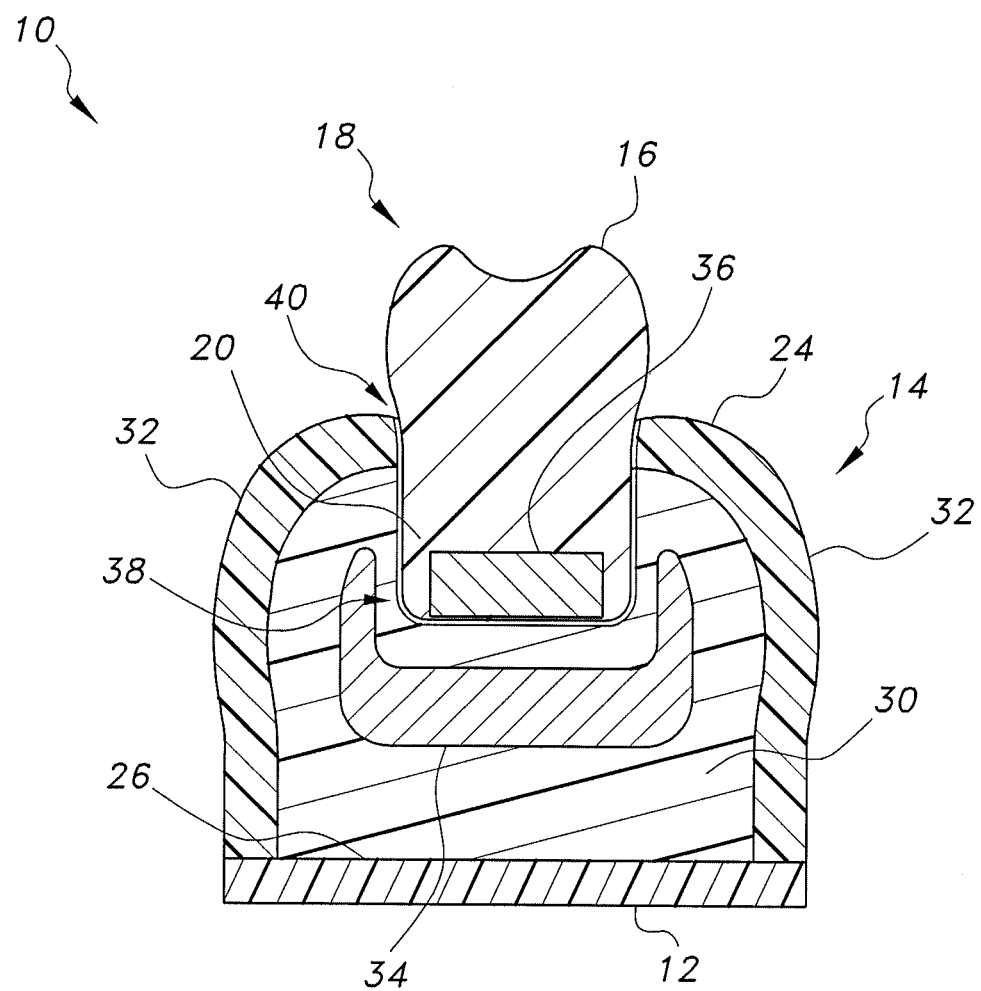
FIG. 4 is a partial side view in section a single tooth and gum assembly of the dental education model of FIG. 1.

As shown in FIG. 4, the substantially U-shaped member 14 is preferably formed from a rigid inner core 30, made of plastic or the like, which is covered by a layer of elastomeric material 32, such as silicone. The outer layer of elastomeric material 32 is preferably textured, colored and made with an appropriate softness and resilience to realistically simulate human gingiva. It should be understood that the base plate 12 and the substantially U-shaped member 14 may be formed integrally as a one-piece structure or may be manufactured as separate elements. As further shown in FIG. 4, a plurality of first magnetic connectors 34 are embedded in the substantially U-shaped member 14 adjacent to the closed ends 38 of the plurality of recesses 22. That is, for each recess 22 formed in the substantially U-shaped member 14, a corresponding one of the first magnetic connectors 34 is embedded within the inner core 30 beneath the closed end 38 of the recess 22.

As best seen in FIGS. 1 and 4, a plurality of simulated teeth 16 are supplied with the model 10, each tooth 16 having opposed coronal and root portions 18, 20, respectively. The root portions 20 of the plurality of teeth 16 are removably received within corresponding recesses 22 formed in the substantially U-shaped member 14, according to the shape of the tooth 16 being simulated and the position of the recess 22. The coronal portions 18 of the plurality of teeth 16 are respectively simulative of crowns of human teeth. As shown in FIG. 4, a plurality of second magnetic connectors 36 are respectively embedded in the root portions 20 of the plurality of teeth 16, such that the first and second magnetic connectors 34, 36 are magnetically attracted to one another to releasably and removably hold the teeth 16 within the recesses 22.

It should be understood that each first magnetic connector 34 may be a magnet and each second magnetic connector 36 may be a piece of ferromagnetic metal, for example. Alternatively, each first magnetic connector 34 may be a piece of ferromagnetic metal and each second magnetic connector 36 may be a magnet. As a further alternative, each of the first and second magnetic connectors 34, 36 may be magnets, the poles of the first magnetic connectors 34 being aligned opposite the poles of the second magnetic connectors 36. Further, since the dental education model 10 is designed to realistically simulate the human jaw and teeth, it should be understood that first and second magnetic connectors 34, 36 should be sized accordingly. For example, each of the first magnetic connectors 34 is positioned beneath a corresponding closed end 38 of a recess 22. The recesses 22 are arrayed and sized to simulate the sockets that receive teeth in a human jaw. Thus, each first magnetic connector 34 may have horizontal dimensions of approximately 1.5 cm×1.5 cm.

Similarly, the teeth 16 are manufactured to realistically simulate human teeth, and may be formed from white plastic or the like. Each second magnetic connector 36 is embedded within the root portion 20 of a tooth 16 and may, for example, be in the form of a circular disc having a diameter of 0.7 cm. For such exemplary dimensions, the root portion 20 of each tooth 16 may be substantially cylindrical, having a height of approximately 1.0 cm and a diameter of approximately 1.0 cm.

It is to be understood that the dental education model is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A dental education model to realistically simulate the human jaw and teeth, consisting of:
   a pair of base plates;
   a pair of substantially U-shaped members, each of the U-shaped members having upper and lower surfaces, the lower surface being mounted on the base plate, the upper surface having a plurality of recesses defined therein, each of the recesses having opposed open and closed ends, wherein the recesses are arrayed and distinctly sized to simulate the sockets that receive teeth in a human jaw, each of the substantially U-shaped members including a rigid inner core and a layer of elastomeric material covering the inner core and simulating a human gingiva of the upper and lower jaws;
   a plurality of first magnetic connectors embedded in each of the substantially U-shaped members adjacent to the closed end of each of the recesses, wherein each of the first magnetic connectors have a first size and configuration;
   a plurality of teeth having opposed coronal and root portions, the root portions of the teeth being removably received within a corresponding one of the recesses in each of the substantially U-shaped members, the coronal portions of each of the teeth simulating of crowns of human teeth according to the position of the corresponding recess in each of the U-shaped members; and
   a plurality of second magnetic connectors embedded in the root portions of the plurality of teeth, wherein each of the second magnetic connectors have a second size and configuration smaller than the first magnetic connectors, the first and second magnetic connectors being magnetically attracted to one another.

2. The dental education model as recited in claim 1, wherein the layer of resilient material comprises silicone.

3. The dental education model as recited in claim 1, wherein the plurality of teeth consists of sixteen teeth simulating a set of human upper teeth.

4. The dental education model as recited in claim 1, wherein the plurality of teeth consists of sixteen teeth simulating a set of human lower teeth.

5. The dental education model as recited in claim 1, wherein each said first magnetic connector comprises a magnet and each said second magnetic connector comprises a ferromagnetic metal.

6. The dental education model as recited in claim 1, wherein each said first magnetic connector comprises a ferromagnetic metal and each said second magnetic connector comprises a magnet.

7. The dental education model as recited in claim 1, wherein each said first magnetic connector and each said second magnetic connector comprises a magnet.

\* \* \* \* \*